May 5, 1942.  W. J. GAZEY  2,281,573
METHOD AND APPARATUS FOR MAKING BRANCH-FITTING BLANKS
Filed Sept. 26, 1938   4 Sheets-Sheet 1
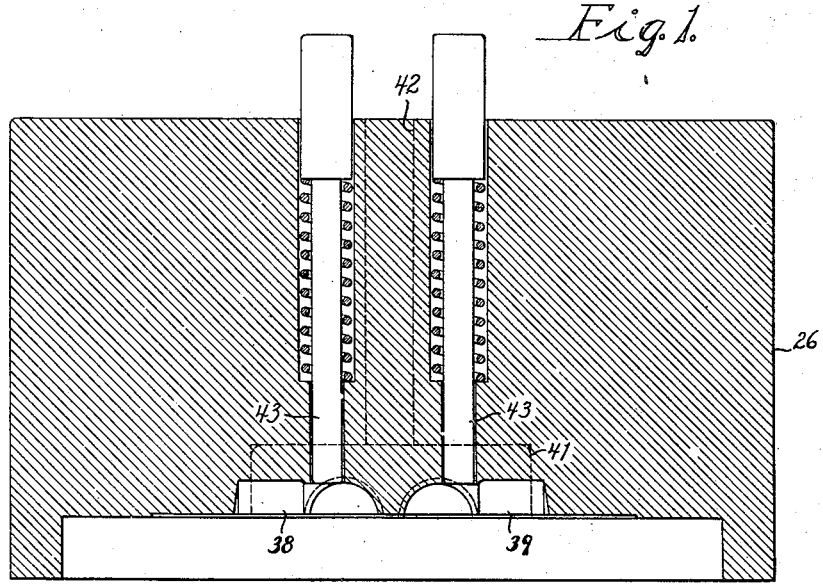
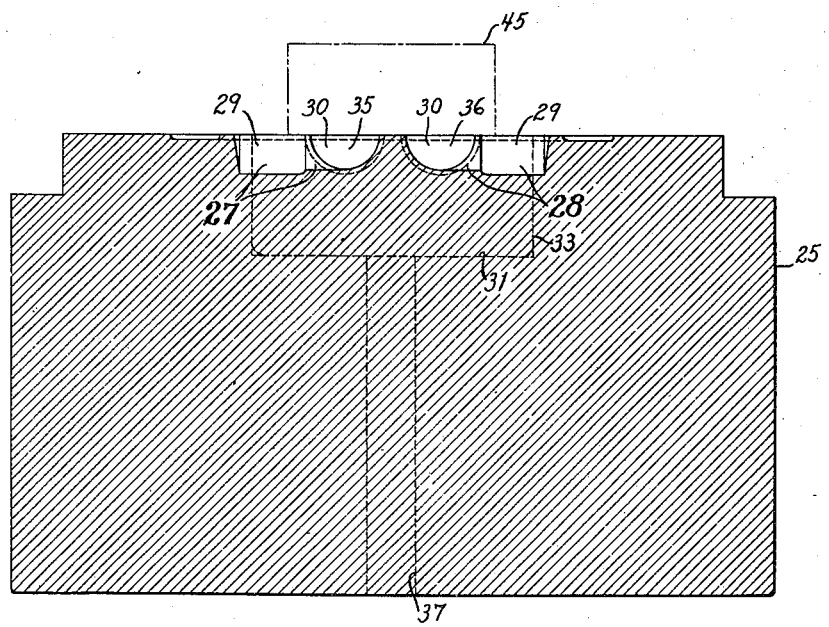
Inventor
By William J. Gazey
Seymour Earle Nichols
Attorneys

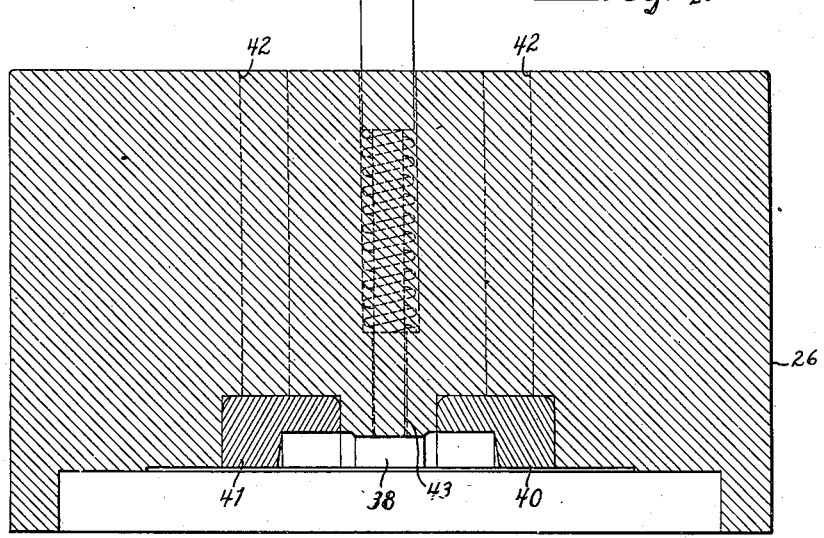
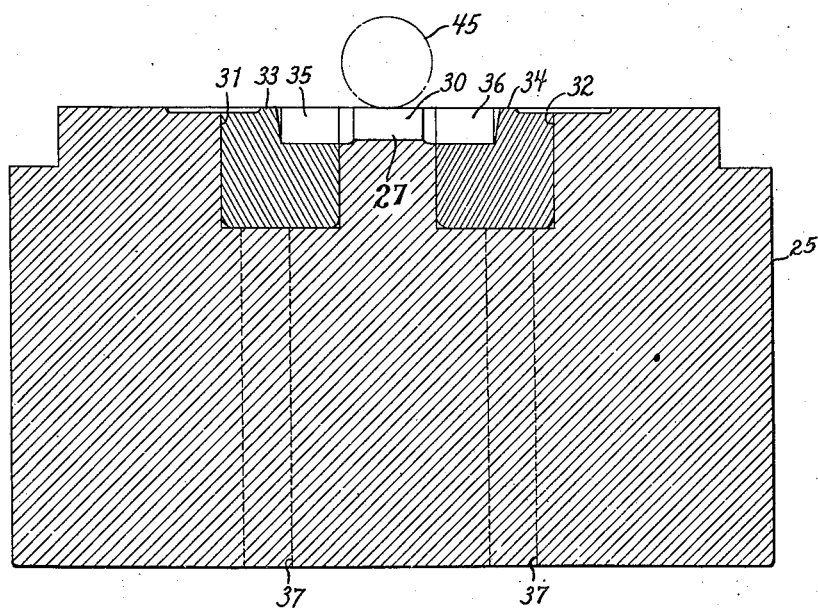

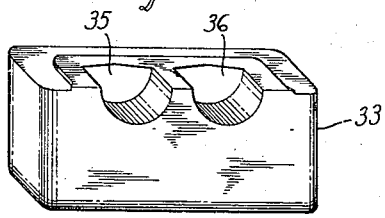
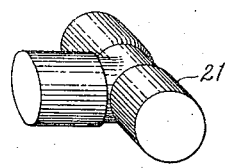
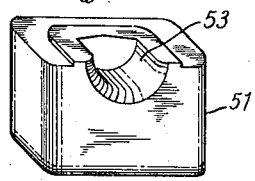
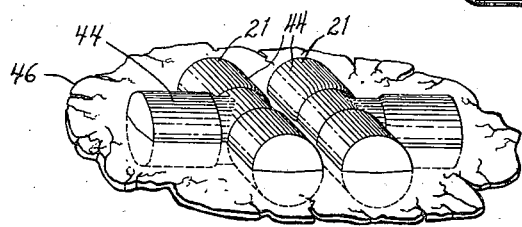
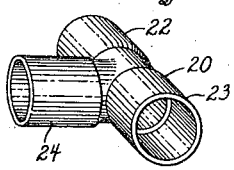
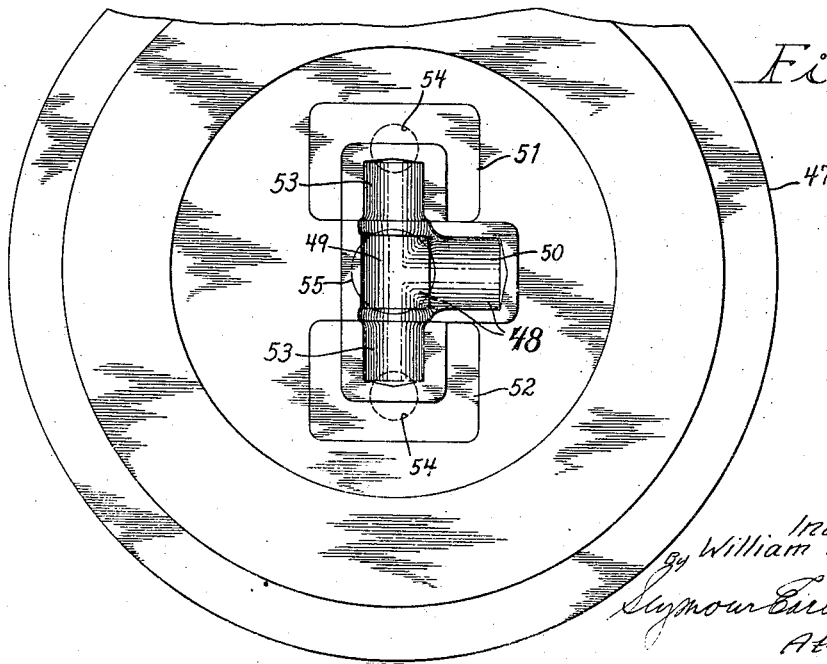

Patented May 5, 1942

2,281,573

UNITED STATES PATENT OFFICE 2,281,573

METHOD AND APPARATUS FOR MAKING BRANCH-FITTING BLANKS

William J. Gazey, Waterbury, Conn., assignor to Chase Brass & Copper Co., Incorporated, Waterbury, Conn., a corporation Application September 26, 1938, Serial No. 231,658

2 Claims. (Cl. 78—60)

This invention relates to improvements in methods and apparatus for making branch-fitting blanks by die-forging.

One object of this invention is to provide an improved and more economical method of die-forging branch-fitting blanks.

Another object of this invention is to provide improved and more economical apparatus for die-forging branch-fitting blanks.

With the above and other objects in view, as will appear to those skilled in the art from the present disclosure, this invention includes all features in the said disclosure which are novel over the prior art.

In the accompanying drawings, in which certain ways of carrying out the invention are shown for illustrative purposes:

Fig. 1 is a vertical sectional view through a pair of die-members made in accordance with the present invention;

Fig. 4 is a vertical sectional view through the pair of die-members on line 4—4 of Figs. 2 and 3;

Fig. 5 is a perspective view of one of the lower insert-blocks shown in Figs. 1, 2 and 4;

Fig. 6 is a perspective view of a double branch-fitting blank after completion of the die-forging operation;

Fig. 7 is a perspective view of one of the branch-fitting blanks after the flash has been trimmed away from the blank of Fig. 6 to clean and separate the two branch-fitting blanks;

Fig. 8 is a perspective view of a branch-fitting which has been made by drilling or boring the blank shown in Fig. 7;

Fig. 9 is a top plan view similar to Fig. 2 of a modified form of die-member for making a single branch-fitting blank; and Fig. 10 is a perspective view of one of the insert-blocks shown in Fig. 9.

Figure 2:
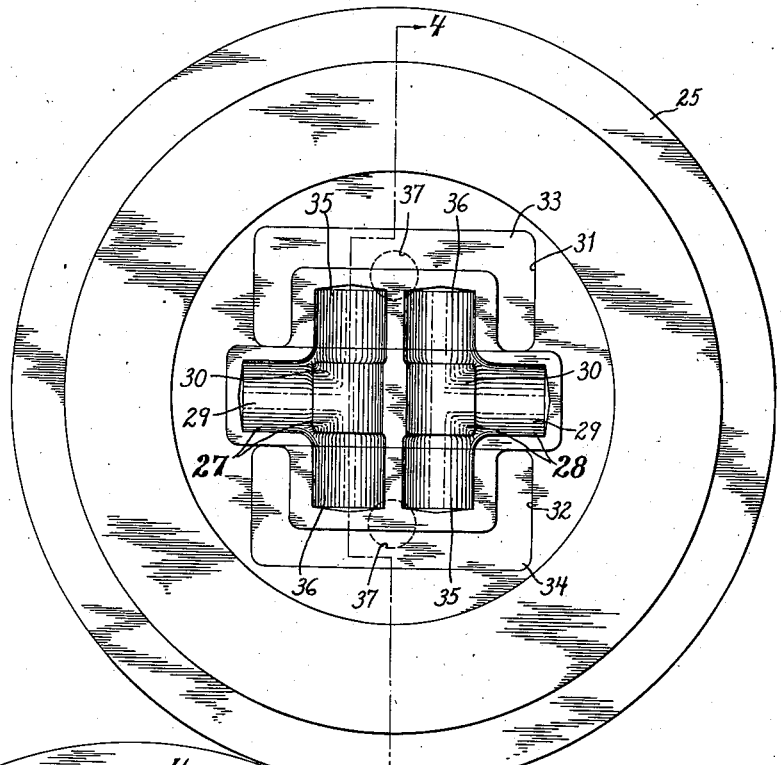
Fig. 2 is a top plan view of the lower die-member shown in Fig. 1.
Figure 3:
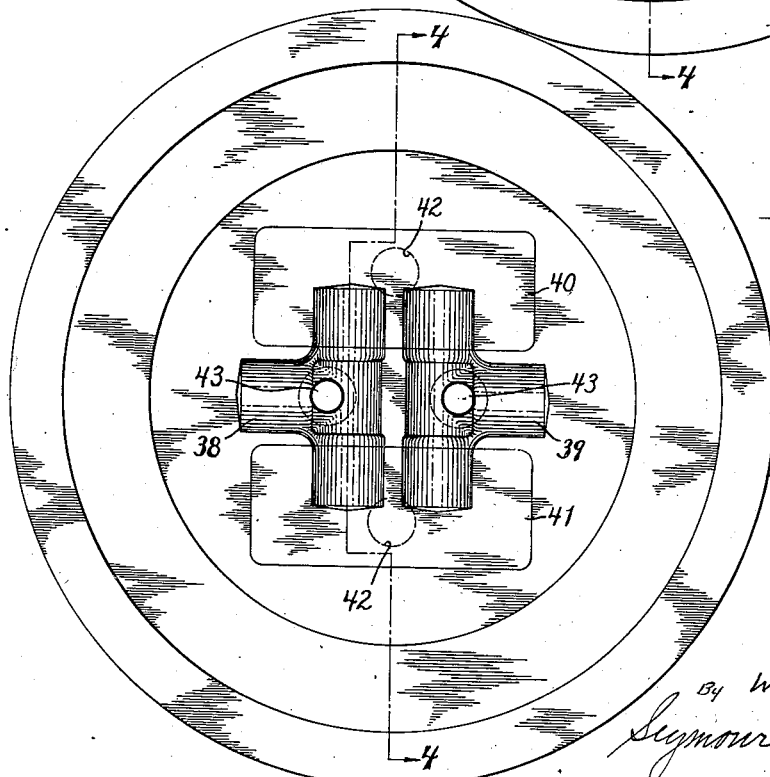
Fig. 3 is a bottom plan view of the upper die-member shown in Fig. 1.

In the description and claims, the various steps and parts are identified by specific names for convenience, but they are intended to be as generic in their application as the prior art will permit.

In the manufacture of branch-fittings such, for example, as the T-fitting 20 shown in Fig. 8 from the forged T-blank 21 shown in Figs. 6 and 7, it will be understood that the line- or run-terminals 22 and 23 of the T-fitting 20 may be either the same or of different sizes and may be the same or different from the branch-terminal 24. It will thus be seen that for making branch-fittings for use with the many sizes of pipes or tubes in commercial use, and for providing these fittings with different size-combinations of terminals to meet different situations, that a large number of different blanks 21 will be necessary from which to drill or bore the branch-fittings.

In order to form or die-forge branch-fitting blanks such, for example, as 21, shown in Figs. 6 and 7, a pair of forging-dies or die-members consisting of a lower die-member 25 and an upper die-member 26 may be mounted in any suitable press or forging machine so as to have movement relatively oppositely toward one another, usually by the upper die-member having all the movement, against a billet or slug of metal such, for example, as copper or high-copper alloy, heated to forging temperature, to form or die-forge the branch-fitting blank. It will be appreciated that if each different branch-fitting blank were made by a separate pair of die-members, there would be a very large cost or expense for the die-members. But, by constructing the die-members in accordance with the present invention, the cost of producing forged branch-fitting blanks can be greatly reduced. Thus, instead of making a new complete pair of die-members for each separate branch-fitting blank to be forged, the die-members can be formed so as to receive any of several pairs of die-inserts, which are relatively small and inexpensive, to thus permit of the economical and ready substitution of one pair of die-inserts for another to accomplish the manufacture of branch-fitting blanks having any desired one of a number of different size-combinations of terminals.

Thus, the lower die-member 25 is provided with forming-cavity portions, generally designated respectively by the numerals 27 and 28, each forming-cavity portion including a terminal-forming cavity-portion 29 and a body-forming cavity-portion 30. The lower die-member 25 also has two insert-block cavities 31 and 32 adapted to respectively receive insert-blocks 33 and 34. Each insert-block has two terminal-forming cavity-portions 35 and 36. Two knockout-holes 37 are adapted to have pins or rods forced through them against the base of the insert-blocks to force them out of their places in the die-member 25, for the purpose of substituting other insert-blocks.

The upper die-member 26 is similarly provided with forming-cavity portions, generally designated respectively by the numerals 38 and 39 and with insert-blocks 40 and 41. Knockout-holes 42 are also provided for ready removal of the insert-blocks. Spring-retracted knockout-pins 43 are also provided for the knocking out of the forged blank by the action of the upstroke of the press-ram carrying the upper die-member 26.

By having the dies or die-members constructed to manufacture a double branch-fitting blank such as the blank 44 shown in Fig. 6, a higher speed of production and consequent greater degree of economy is accomplished, than where a single branch-fitting blank is made at one stroke of the press. Under this circumstance, I find satisfactory results are obtained by using a single cylindrical billet 45 laid horizontally across the body-forming cavities 30 of the lower die-member 25. Upon the two die-members being forced together, this single billet of metal is spread out and fills the two branch-fitting cavities to form the blank 44 together with the flash 46 shown thereon.

After trimming off the flash 46 and separating the two T- or branch-blanks 21, the latter are ready for drilling or boring to produce T's or branch-fittings 20 such as illustrated in Fig. 8.

Where the quantity of branch-fittings to be manufactured is comparatively small, part of the benefits of the present invention can be obtained without the employment of double-cavity dies. Thus, as shown in Figs. 9 and 10, each of the lower and upper die-members 47 (only one being shown) may be provided with a forming-cavity portion, generally designated by the numeral 48 and including a body-forming cavity-portion 49 and a terminal-forming cavity-portion 50. Insert-blocks such as 51 and 52 are provided, each having a terminal-forming cavity-portion 53. The usual knockout-holes 54 provide for removal and substitution of other insert-blocks having other sizes of terminal-forming cavity-portions. In the case of this form of the invention, I find it satisfactory to use a cylindrical slug or billet stood on end, as indicated at 55 in Fig. 9.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. Apparatus for making a plurality of branch-fitting blanks each having a total of at least three line- and branch-terminals, of any desired one of a number of different size-combinations of said terminals, comprising: a pair of die-members each of which has a plurality of body- and terminal-forming cavity-portions and one or more insert-block cavities each designed and adapted to receive any desired one of a number of different insert-blocks, each insert-block having a plurality of terminal-forming cavity-portions complemental to the other insert-block of a pair, and different pairs having different sizes of terminal-forming cavity-portions.

2. Apparatus for making a branch-fitting blank having a total of at least three line- and branch-terminals, of any desired one of a number of different size-combinations of said terminals, comprising: a pair of die-members each of which has body- and terminal-forming cavity-portions and one or more insert-block cavities each designed and adapted to receive any desired one of a number of different insert-blocks, each insert-block having a terminal-forming cavity-portion complemental to a corresponding terminal-forming cavity-portion in the other insert-block of a pair, and different pairs having different sizes of terminal-forming cavity-portions.

WILLIAM J. GAZEY.